Patented Sept. 17, 1940

2,214,783

UNITED STATES PATENT OFFICE

2,214,783

PROCESS AND REAGENT FOR RESOLVING EMULSIONS

Truman B. Wayne, Houston, Tex.

No Drawing. Application July 29, 1938,
Serial No. 222,056

8 Claims. (Cl. 252—332)

This invention relates to the art of resolving petroleum emulsions of the character commonly encountered in the production, handling and refining of petroleum.

The principal object of this invention is to provide an improved process and reagents for treating petroleum emulsions to separate them into their component parts of oil and water.

Another object is to provide a novel product or reagent, particularly one of the modified alkyd resin type, but which is so modified as to be water-wettable in order to enable its employment as a demulsifier, or for such uses where water-wettable properties and characteristics are necessary or desirable.

Further objects will appear from the following, in which the reagent and the process for its employment will be described as related to their employment for the treating of petroleum emulsions.

The present process comprises subjecting a petroleum emulsion of the water and oil type to the action of small proportions of a complex organic condensation product of high molecular weight, resembling somewhat the synthetic resins produced by the condensation of two or more organic bodies containing resinophore groups but differing from the conventional synthetic resins or modified synthetic resins in that they have been rendered suitable for petroleum dehydration through structural modification which imparts to them the characteristics or properties necessary for this purpose.

The treating agent used in my process consists of a fatty modified "glyptal" type resin which is additionally characterized by the presence of a residue or residues from an amino, or amino-hydroxy, aromatic or hydroaromatic body in the same molecule. The modified glyptal resin body may contain other modifying group or groups which increase the water-wettable properties of the molecule and which promote its segregation at the interface of the water-in-oil emulsion in the form of a water-wettable, and to at least some extent, hydrated, colloid. It is further characterized by a polycarboxy acid residue or residues, and a sulfonic or sulfonamide group.

Various embodiments of the above described structural features of my improved demulsifying agents are illustrated in the following examples. While an attempt will be made to define the course of the various chemical reaction products, and approximately state their composition, it is to be understood, however, that the invention is not dependent on any theory herein expressed as to the course of the reactions or as to the composition of the products except as defined in the appended claims.

Example I

Di-ricinoleyl toluidide is prepared by heating 624 parts of castor oil (or 596 grams of ricinoleic acid) with 107 grams o-toluidine in the presence of 10-20 parts of concentrated $H_2SO_4$. The heating is preferably done at 200–210° C. in the presence of an inert solvent which carries out the water of reaction. The heating is stopped when a theoretical, or approximately theoretical, yield of water has been recovered. To the amide in solution in the inert solvent is gradually added 1200 parts of 98% $H_2SO_4$ while constantly stirring and cooling, after which the temperature is raised to 70° C. and maintained until considerable water solubility is evidenced. The product is then cooled, diluted with an equal volume of water, agitated thoroughly to wash the oily product, and the dilute acid is withdrawn. The recovered layer is dehydrated by distilling off the remaining water.

The sulfonated di-ricinoleyl toluidide is then preferably converted to an amide by heating it with a molecular equivalent of mono- or di-ethanolamine while distilling off the water formed. The hydroxy-alkyl or hydroxy-alkylene amines are preferred in that they contain hydroxyl groups which subsequently react with the polycarboxy acids. However, amides of non-hydroxy N-alkylated, N-cycloalkylated, or N-aralkylated amines may be prepared at this stage, and enough polycarboxy acid used to react only with the hydroxyls remaining on the ricinoleyl residues after sulfonation, or generated by sulfation followed by hydrolysis at the double bond. An amount of phthalic anhydride roughly equivalent to the hydroxyl content of the sulfonamide is then added and the reaction conducted at 150–200° C. At the lower temperature only one carboxyl of each mol of phthalic anhydride reacts, but at the higher temperature more complete esterification, accompanied by increased resinification, occurs. The degree of resinification, therefore, may be governed to meet the requirements of the various emulsions encountered.

Example II

It is more convenient to start with a sulfonated aromatic amine such as sulfanilic acid which is readily obtained commercially.

165 parts of commercial sulfanilic acid, 600 parts of ricinoleic acid, 100 parts of solvent naphtha, and 7 parts of 98% $H_2SO_4$ were heated at 200–210° C. until acylation of the amino group was complete. 90 parts of monoamylamine were added and the heating was continued until the yield of water indicated completion of the N-alkylated sulfonamide of di-ricinoleyl sulfanilamide. To this was added 148 parts of phthalic anhydride and the mass was heated to 150° C. for six hours to form the half ester.

Example III

One half of the condensation product prepared by the procedure described in Example II was heated at 200° C. until the theoretical yield of water was obtained. This product was more resinous than the product from Example II, and is more efficient in the treatment of some emulsions.

Example IV

An amino phenol such as p- or m- aminophenol, or a substituted amino phenol such as anisidine or phenetidine, is heated with one or two mols of a hydroxylated fatty acid to form the corresponding amide or di-amide. The reaction product is then heated with a molecular proportion of phthalic anhydride 4-sulfonic acid to form a sulfonated, fatty modified polycarboxy acid ester characterized also by the presence of a residue from an amino-hydroxy aromatic body. In preferred practice 110 parts of amino phenol, 600 parts of ricinoleic acid, 300 parts of solvent naphtha, and 10 parts of 98% $H_2SO_4$ are heated at 200° C. until 36 parts of water have been recovered. Presumably both hydrogens of the amino group have been replaced, but possibly only one ricinoleyl residue entered the amino group and the other esterified the hydroxyl group of the phenol. To the above was added 228 parts of phthalic anhydride 4-sulfonic acid and the mass was heated at 150° C. to form the ester. If complete esterification is desired, the heating can be conducted at 200° centigrade until a theoretical yield, or nearly so, of water is obtained. As has been previously disclosed, the demulsifying properties of the final product can be varied by the degree of condensation, and a variety of products can be prepared by stopping the condensing reactions at various points between the initial addition reaction involving the anhydride radical, and complete esterification of the second carboxyl of the phthalyl residue. Whenever a residual carboxyl or sulfonic group is present, it may be converted to a salt, amide, or ester in any conventional manner.

Example V

An amino phenol such as para or meta aminophenol, or a substituted amino phenol such as anisidine or phenetidine, is heated with one or two mols of sulfo ricinoleic acid that is characterized by the presence of a true $SO_3H$ group attached to a carbon atom of the hydrocarbon chain. This true sulfo ricinoleic acid can be prepared by treating ricinoleic acid at temperatures ranging from zero to 10° C. with an excess of fuming sulfuric acid preferably in the presence of a chlorinated hydrocarbon which acts both as a solvent and catalyst for the introduction of the true sulfonic group. The reaction between the amino phenol and the sulfo ricinoleic acid is carried out so that a corresponding amide or diamide of the amino phenol is formed. The reaction product is then neutralized with an equivalent of a polyhydroxyamine, for instance, diethanolamine or triethanolamine, to form the amine salt. If desired, a primary or secondary hydroxyalkylamine can be used and the amide formed instead of a salt by dehydration of the amine salt by heating it at 150° to 250° C., preferably in the presence of an inert carrier which will remove the water of reaction. The hydroxy-amine derivative, whether a salt or the corresponding amide, is then heated with one or more molecular proportions of phthalic anhydride to form a sulfonated fatty modified polycarboxy acid ester characterized also by the presence of a residue from an amino hydroxy aromatic body and further characterized by the presence of a true sulfonic group or residue attached directly to the fatty chain.

In preferred practice 110 parts of amino phenol, 800 parts of sulfo ricinoleic acid, and 300 parts of trichlorethylene are heated at 200° C. until 36 parts of water have been recovered. Presumably both hydrogens of the amino group have been replaced, but possibly only one sulfo ricinoleyl residue entered the amino group and the other esterified the hydroxyl group of the amino phenol. To the above is added 148 parts of phthalic anhydride and the mass is heated at 150° C. to form the ester. If complete esterification is desired, the heating may be conducted at 200° C. until a theoretical yield, or nearly so, of water is obtained.

This product is characterized by a residue from an amino phenol in which the nitrogen atom N is attached directly to the aromatic residue R and in which the amino group has been substituted by one or more residues derived from sulfo ricinoleic acid. The sulfonic group which in this case is attached directly to the fatty chain is neutralized with a hydroxy amine or is converted to the corresponding hydroxy amide derivative. The polycarboxy acid is then condensed with the hydroxyl groups of the amino residue to produce a modified synthetic resin of the modified alkyd type which is water-wettable and of value in the dehydration of petroleum emulsions.

Among suitable amino and amino-hydroxy aromatic or hydroaromatic chemicals suitable for my purpose are aniline, toluidine, xylidene, mesidine, benzylamine, naphthylamine, amino phenols, amino naphthols, and similar aromatic amino compounds in which an amino residue is attached directly to a benzenoid ring. Their sulfonated, halogenated, and hydrogenated derivatives are likewise contemplated. The specific examples given above make it evident that the sulfonated derivatives are often used to even greater advantage.

Any of the acids of the aliphatic series, or their corresponding esters which undergo hydrolysis in the described procedures, are suitable provided they have eight or more carbon atoms in their hydrocarbon chain. However, I prefer to use a hydroxylated fatty acid such as ricinoleic acid, or else it is necessary to provide hydroxyl groups from other sources, usually a hydroxy-amine, for condensation with the polycarboxy acid.

The polycarboxy acid may be selected from the group comprising phthalic, terephthalic, succinic, citric, malic, maleic, fumaric, adipic, tartaric, oxalic, pimelic, suberic, azelaic, and sebacic acids, or their anhydrides.

Various amines are suitable for my purpose. Among these are the alkylolamines such as monoethanolamine, diethanolamine, and the corresponding primary and secondary amines, higher in the homologous series. One may also employ the various non-hydroxy alkylamines, aralkylamines, alicyclic and hydroaromatic amines when the hydroxylation of the molecule has been otherwise provided; for instance, through the use of hydroxy-acids or even a polyhydroxy amino body. Moreover, hydroxylation of these amines is readily accomplished by reacting them with suitable glycol or glycerol chlorohydrins, alkylene oxides, etc.

With the examples given, it will be seen that there is produced a modified alkyd resin condensation product of the general type

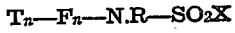

wherein T is a polycarboxylic acid residue, F is a residue derived from a fatty carboxylic acid, R is an aromatic body having one or more benzenoid rings, N is the amino residue attached directly to R, $n$ is the number 1 or more, and $SO_2X$ is a sulfo group, or its neutralized equivalent, such as the alkali-metal, ammonium or amine salt, or an N-alkylated sulfonamide group. The $SO_2X$ group may be attached to T, as in Example IV, or to R as in Examples I, II and III, or to F in Example V. The proportion of the $SO_2X$ group to the remainder of the structure is sufficient to impart a water-wettable characteristic to the product. This renders the product hydrophilic and enables its employment as a demulsifier or for such uses where water-wettable properties are necessary.

The above examples are only a few of the many products which may be prepared according to the principles disclosed in the foregoing discussion. While sulfonation is preferably done on one or more of the reacting constituents or ingredients prior to formation of the final, complex, resinous or semi-resinous product, it should be readily understood that sulfonation may be applied to the final product.

Various examples of the many products which answer the descriptions herein made are contemplated. Some may be oil soluble, others water soluble. In many instances they may possess dual solubility to an appreciable extent. Even apparent insolubility is of no consequence, as the products are all soluble at least to the extent necessary for segregation at the emulsion interface as a water-wettable colloid. The suitability of any of these products to the breaking and resolving of any given emulsion can readily be determined by the conventional procedures now in general use in oil fields and in laboratories which make such determinations.

Where reference is made to "sulfo" groups, it is understood that these include $OSO_3H$ and $SO_3H$ groups, and their neutralization products.

Where reference is made to "fatty acids," it is understood to include aliphatic acids having eight or more carbon atoms in their hydrocarbon chain, rosin and resin acids, naphthenic acids, and the like. The term "soap-forming" refers to these acids and also sulfonic acids derived from various aliphatic, alicyclic, hydroaromatic and aromatic bodies found in, or derived from, coal tar, asphalt, petroleum, etc.

Where reference is made to polycarboxy acids in the appended claims, it is understood that this term is meant to also include the corresponding anhydrides, as will be noted by reference to the examples hereinbefore given.

The term "water-wettable" as used in the specification and claims refers to the characteristic of the product which enables it to be readily wetted by water and which is usually accompanied by some degree of hydration of the product in contact with the aqueous phase of the emulsion. When the product segregates at the interface of the emulsion and is adsorbed at the interfacial film where the hydrophobe body responsible for the emulsion exists, the water-wettable property of this product counteracts the effect of the hydrophobe present in the emulsion and thus effects its resolution.

The term "water-soluble" is used to include the property of forming colloidally hydrated aqueous solution. From the following paragraph it will be seen that only a limited degree of actual "water solubility" is necessary for the reagents used for breaking petroleum emulsions, for the reason that extremely small proportions of the reagents are ordinarily used.

The term "oil soluble" is used to include the property of colloidal dispersion in the oil phase.

The improved treating agents prepared in accordance with the present invention are used in the proportion of one part of treating agent to form 2,000 to 20,000 parts (or, in some cases, as high as 30,000 parts) of petroleum emulsion, either by adding the concentrated product directly to the emulsion or after diluting with water or oil in the conventional manner. The treating agents may be used in any of the numerous ways commonly employed in the treatment of petroleum emulsions as will be apparent.

I claim:

1. A petroleum demulsifying composition which comprises as a component a modified alkyd resin condensation product of the general type $T_n$—$F_n$—$N.R$—$SO_2X$, wherein T is a polycarboxy acid residue; F is a residue derived from a fatty carboxylic body; R is an aromatic body having one or more benzenoid rings; N is the amino residue attached directly to R; $SO_2X$ is a sulfo group or its neutralized equivalent, or an N-alkylated sulfonamide group which may be attached to T, F, R; and $n$ is the number 1 or more.

2. A petroleum demulsifying composition which comprises as a component a modified alkyd resin condensation product prepared from an aromatic amino body, one or more equivalents of a carboxylic acid derived from a fatty body, an alkyl amine, and one or more molecular equivalents of a polycarboxy acid body.

3. A petroleum demulsifying composition which comprises as a component a modified alkyd resin condensation product prepared from an aromatic amino body, one or more molecular equivalents of a hydroxylated carboxylic acid derived from a fatty body, and one or more molecular equivalents of a polycarboxy acid body.

4. In the process of breaking petroleum emulsions, the step of adding thereto a petroleum demulsifying composition which comprises as a component a modified alkyd resin condensation product of the general type $T_n$—$F_n$—$N.R$—$SO_2X$, wherein T is a polycarboxy acid residue; F is a residue derived from a fatty carboxylic body; R is an aromatic body having one or more benzenoid rings; N is the amino residue attached directly to R; $SO_2X$ is a sulfo group or its neutralized equivalent, or an N-alkylated sulfonamide group which may be attached to T, F, or R; and $n$ is the number 1 or more.

5. In the process of breaking petroleum emulsions the step of adding thereto a petroleum demulsifying composition which comprises as a component a modified alkyd resin condensation product prepared from an aromatic amino body, one or more equivalents of a carboxylic acid derived from a fatty body, an alkyl amine, and one or more molecular equivalents of a polycarboxy acid body.

6. In the process of breaking petroleum emulsions the step of adding thereto a petroleum demulsifying composition which comprises as a component a modified alkyd resin condensation product prepared from an aromatic body, one or more molecular equivalents of a hydroxylated carboxylic acid derived from a fatty body, and one or more molecular equivalents of a polycarboxy acid body.

7. A modified water-wettable alkyd resin condensation product of the general type $T_n$—$F_n$—N.R—$SO_2X$, wherein T is a polycarboxy acid residue; F is a residue derived from a fatty carboxylic acid joined by a carbon to nitrogen linkage at the amino residue, N, of the aromatic body, R, said aromatic body being further characterized by having at least one benzenoid ring; $SO_2X$ is a radical selected from the group comprising sulfo and N-alkylated sulfonamide groups, and which may be attached to T, F, or R; and $n$ is the number 1 or more.

8. A modified water-wettable alkyd resin condensation product of the general type $T_n$—$F_n$—N.R—$SO_2X$, wherein T is a polycarboxy acid residue; F is a residue derived from a fatty carboxylic acid joined by a carbon to nitrogen linkage at the amino residue, N, of the aromatic body, R, said aromatic body being further characterized by having at least one benzenoid ring; $SO_2X$ is a radical selected from the group comprising sulfo and N-alkylated sulfonamide groups, and which may be attached to T, F, or R; and $n$ is the number 1 or more, and in which the proportion of the $SO_2X$ radical to the remainder of the structure is sufficient to impart water-wettable characteristics to the product.

TRUMAN B. WAYNE.